Feb. 4, 1964     W. G. LIPPERT     3,120,168
CONTROL MECHANISM FOR POPCORN MACHINE
Filed July 30, 1958     2 Sheets-Sheet 1
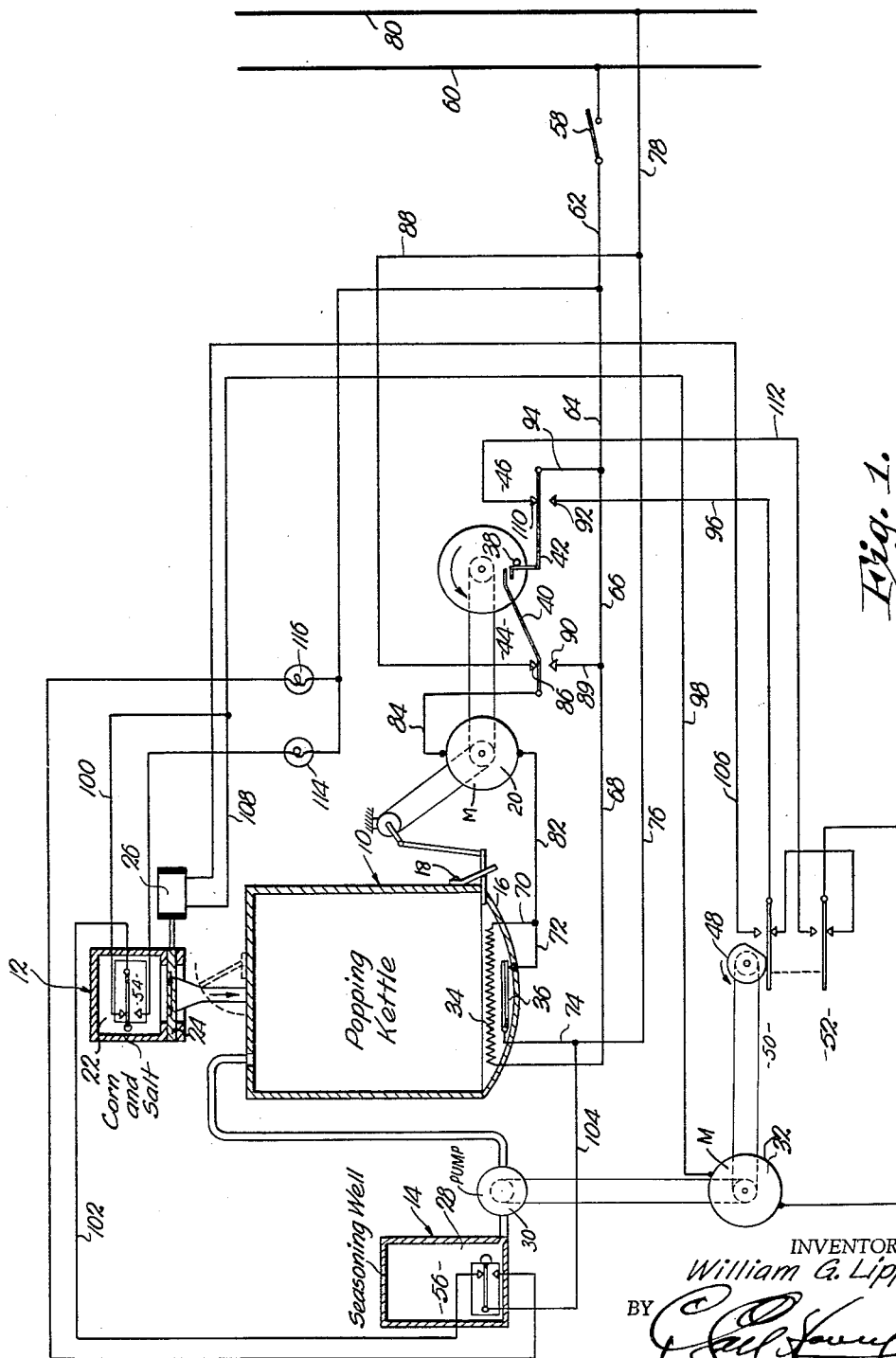
Fig. 1.
INVENTOR.
William G. Lippert
ATTORNEY.

Feb. 4, 1964 W. G. LIPPERT 3,120,168
CONTROL MECHANISM FOR POPCORN MACHINE
Filed July 30, 1958 2 Sheets-Sheet 2
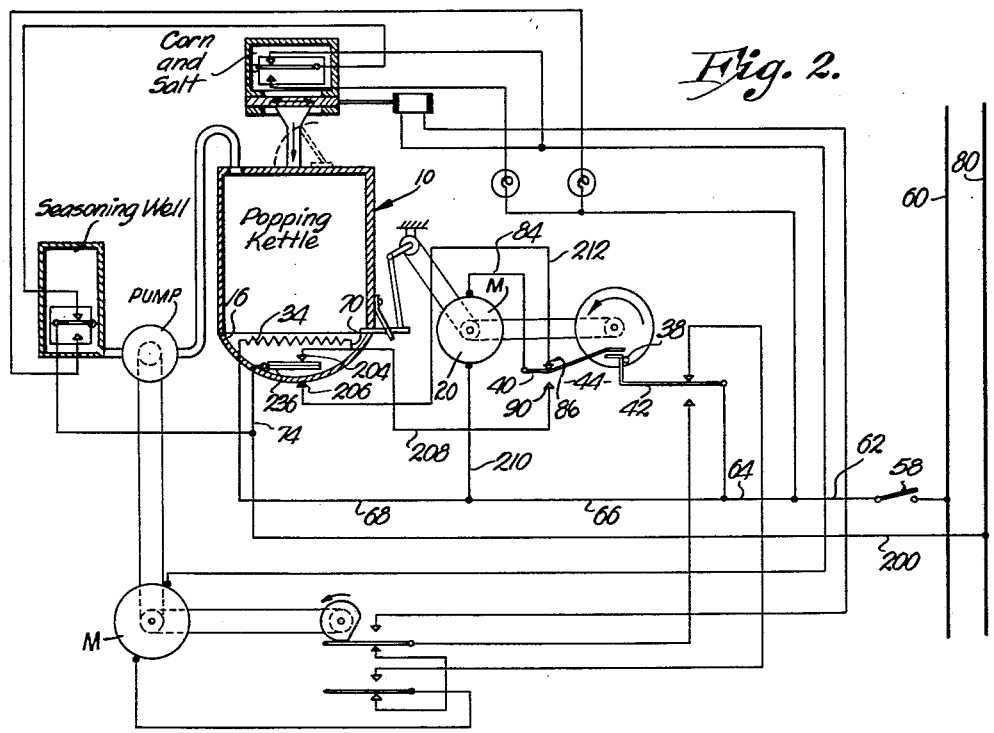
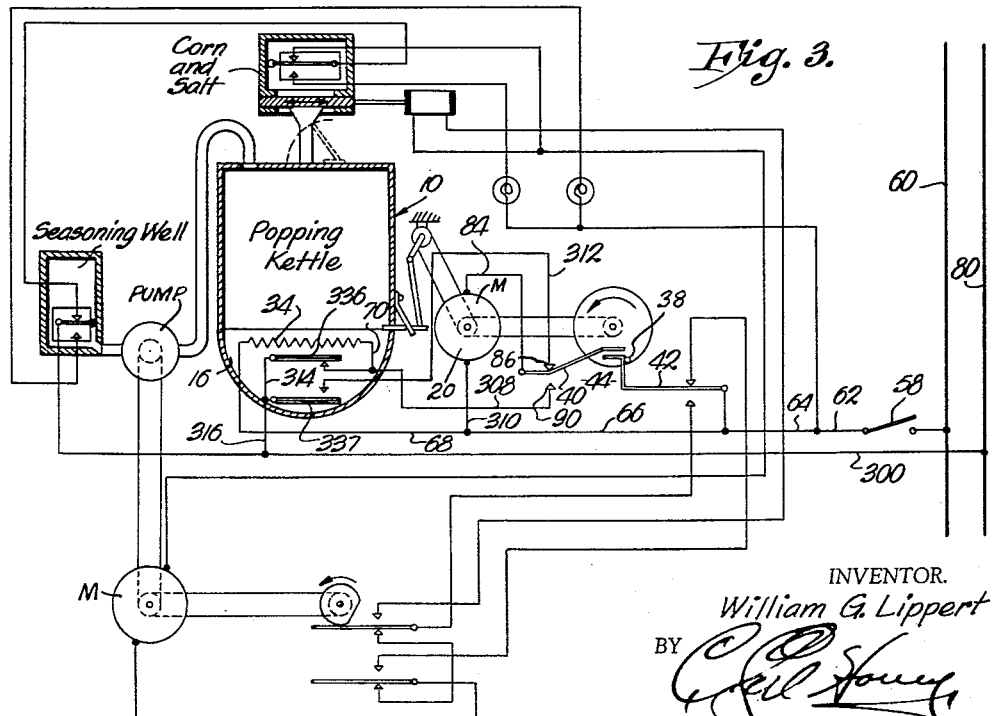
INVENTOR.
William G. Lippert
BY
ATTORNEY.

United States Patent Office 3,120,168
Patented Feb. 4, 1964

3,120,168
CONTROL MECHANISM FOR POPCORN MACHINE
William G. Lippert, Kansas City, Mo., assignor to Manley, Inc., Kansas City, Mo., a corporation of Missouri
Filed July 30, 1958, Ser. No. 752,053
8 Claims. (Cl. 99—238.3)

This invention relates to a machine for the preparation of popcorn, and more particularly to control mechanism therefor, the primary object being to provide a fully automatic machine capable of successive cycles of operation contemplating the dispensing of corn and salt, as well as liquid seasoning into a popping kettle, dumping the popcorn from the kettle and reinitiating successive cycles without operator attention until one of the ingredient supplies becomes exhausted.

It is an important object of the present invention to provide a popcorn machine of the kind employing thermostatic control means for determining the period of time during which popping takes place by initially causing a dumping action when the popping kettle rises to a predetermined temperature, there being apparatus for thereupon feeding a new batch of corn, salt and seasoning into the kettle, whereupon the heating cycle is resumed as soon as the thermostatic means cools to a predetermined temperature.

Another important object of the instant invention is to provide a popcorn machine wherein dumping apparatus is employed having an additional function of initiating automatic feeding of the ingredients to the kettle to the end that successive batches are popped immediately upon reclosing of a heater circuit by operation of the thermostatic means.

A still further object of the present invention is to provide a popcorn machine that employs control means responsive to dumping for directing seasoning into the kettle, and to successively provide for dispensing of corn and salt in response to the operation of the feeding of the seasoning.

In the drawings:
FIG. 1 is a schematic, diagrammatical view illustrating a control mechanism for popcorn machines made pursuant to one form of the present invention.
FIG. 2 is a view similar to FIG. 1, illustrating another form of the present invention; and
FIG. 3 is a view similar to FIGS. 1 and 2 showing still another embodiment of the instant invention.

The principles of the instant invention do not depend upon any particular mechanical construction insofar as popping kettle 10, corn and salt dispensing means 12 and feeding means 14 for liquid seasoning are concerned. Kettle 10 is adapted to dump the popped corn by virtue of a downwardly swingable bottom 16, hinged at 18, and under the direct control of a motor 20 that completes one cycle of rotation each time it swings the bottom downwardly and returns it to the kettle-closing position illustrated in FIG. 1.

Dispensing means 12 includes a supply container 22 having slidable gate means 24 under control of solenoid 26 for dumping a measured supply of ingredients to kettle 10 each time solenoid 26 is actuated.

Feeding means 14 includes a seasoning well 28 and a pump 30 for transferring a predetermined amount of seasoning from well 28 to kettle 10 each time motor 32 for pump 30 is energized.

Kettle 10 is preferably constructed according to the kettle assembly set forth in the disclosure "Kettle Assembly for Popcorn Machines," Serial No. 592,028, which has matured into U.S. Letters Patent No. 2,902,920. Corn and salt dispensing means 12 is preferably constructed in the manner set forth in the previous disclosure "Corn and Salt Dispenser for Popcorn Machines," Serial No. 763,395, which has matured into U.S. Letters Patent No. 2,948,438. Feeding means 14 is preferably constructed in the manner set forth in the previous disclosure "Popcorn Machine," Serial No. 38,129, maturing into U.S. Letters Patent No. 2,554,802.

Heating of the kettle 10 to pop the corn is accomplished through the use of electrically responsive heater means 34 in bottom 16, the latter of which also houses thermostatically controlled electrical switching means in the form of a thermostatic switch 36 that remains closed as shown, until kettle 10 is heated to a predetermined temperature.

During operation of motor 20, its drive shaft, being operably coupled to a disc having a pin 38 thereon, rotates the disc one complete revolution to force movable pole piece 40 of a double throw, single pole switching device 44 into engagement with a movable pole piece 42 of a double throw, single pole switching mechanism 46. Similarly, during the rotation of motor 32 through one complete revolution, cam 48, operably coupled to the shaft of motor 32, rotates to force the movable pole pieces of first and second double throw, single pole switches 50 and 52, respectively, out of engagement with one of the poles and into engagement with the other of the poles, it being noted that the movable pole pieces are biased to the said one poles of switches 50 and 52, respectively. Fourth and fifth double throw, single pole switches 54 and 56 mounted within supply container 22 and seasoning well 28, respectively, are responsive to the supply levels of the container 22 and well 28, respectively. The movable pole pieces of switches 54 and 56 engage one of the poles of the respective switch while a sufficient supply of corn and salt remains in container 22 and a sufficient supply of seasoning remains in well 28. When the supplies in container 22 and well 28 drop below minimum levels, the movable pole pieces of each switch move out of engagement with the one pole and into engagement with the other of the poles. Lamps 114 and 116 are operably coupled with switches 54 and 56, respectively, to indicate supply deficiencies in container 22 and well 28, respectively.

A source of electrical power (not shown) is connected to the power lines 60 and 80, and electrical power to supply the needs of heater 34, motor 20, solenoid 26 and motor 32 is drawn off from lines 60 and 80 by virtue of the wires 62 and 78. A manual single pole, single throw switch 58 is inserted into wire 62 to permit electrical power to be delivered to the above components.

The operation of the instant invention is as follows:
Assuming that kettle 10 contains a batch of raw popcorn, salt and seasoning, that bottom 16 is fully closed and that thermostat 36 is closed, closing of manual switch 58 energizes heater 34 through the following circuit:
From line 60, through switch 58, wires 62, 64, 66, and 68, heater 34, wires 70 and 72, thermostat 36, and wires 74, 76 and 78 to line 80.

It is to be noted that the resistance of motor 20 as compared with that of thermostat 36 is relatively high; therefore, current will flow through heater 34 only and motor 20 will not operate until thermostatic switch 36 opens.

When kettle 10 is sufficiently hot the thermostat 36 is caused to be opened, whereupon heater 34 commences to cool and motor 20 is immediately energized through the following circuit:
From line 60, through switch 58, wires 62, 64, 66 and 68, heater 34, wires 70 and 82, motor 20, wire 84, pole 40 and contact 86 of switch 44, and wires 88 and 78 to line 80.

Motor 20 operates to pivot bottom 16 to thereby dump the contents of kettle 10 and return kettle 10 to a position nearly closed, it being noted that the disc operably coupled to motor 20 rotates to cause pin 38 to engage pole piece 40 and force the latter against contact 90 to break the circuit for motor 20 and to de-energize the latter. Before pin 38 comes to rest, pole 42 is forced by pole 40 into engagement with contact 92 and out of engagement with contact 110.

This last mentioned action energizes motor 32 through the following circuit:

From line 60, through switch 58, wires 62, 64 and 94, pole 42 and contact 92 of switch 46, wire 96, switches 50 and 52, motor 32, wires 98 and 100, switch 54, wire 102, switch 56, and wires 104, 76 and 78 to line 80.

Motor 32 operates pump 30 to pump seasoning into kettle 10 until the rotation of cam 48 releases the movable pole pieces of switches 50 and 52, whereupon motor 32 is de-energized and simultaneously, solenoid 26 is energized to open gate means 24 to permit corn and salt to pass into kettle 10 through the following circuit:

From line 60, through switch 58, wires 62, 64 and 94, pole 42 and contact 92 of switch 46, wire 96, switch 50, wire 106, solenoid 26, wires 108 and 100, switch 54, wire 102, switch 56, and wires 104, 76 and 78 to line 80.

Dumping of ingredients into kettle 10 hastens the cooling of thermostat 36 and as soon as the same recloses, motor 20 is again energized through the following circuit:

From line 60, through switch 58, wires 62, 64, 66 and 89, contact 90 and pole 40 of switch 44, wire 84, motor 20, wires 82 and 72, thermostat 36, and wires 74, 76 and 78 to line 80. When motor 20 is again energized, bottom 16 moves toward a completely closed position and the disc rotates so that pin 38 slips off pole piece 40 to permit the latter to move out of engagement with pole piece 42 and again into engagement with contact 86. Pole piece 42 then returns to the position shown in FIG. 1.

As soon as pin 38 slips off pole 40 and assumes the position shown in FIG. 1, the last mentioned circuit for motor 20 is broken, but by this time bottom 16 is fully closed.

Return movement of the pole 42 to the position shown in FIG. 1 energizes motor 32 through the following circuit:

From line 60, through switch 58, wires 62, 64 and 94, pole 42 and contact 110 of switch 46, wire 112, switch 52, motor 32, wires 98 and 100, switch 54, wire 102, switch 56, and wires 104, 76, and 78 to line 80.

Motor 32 does not remain energized sufficiently long to pump any seasoning into kettle 10 for cam 48 soon returns to the position shown in FIG. 1, and as switches 50 and 52 reassume the normal positions illustrated in FIG. 1, motor 32 is de-energized.

When switches 54 and 56 respond to exhausted supplies, lamps 114 and 116 respectively are lighted to alert the operator. Operation of either switch 54 or 56 will prevent motor 32 from operating and, therefore, solenoid 26 from being energized. Thus, at no time will corn and salt alone or seasoning alone, be fed into the kettle 10.

In the modification of FIG. 2, the thermostatic switching device 36 of FIG. 1 has been eliminated in favor of a single pole, double-throw thermostat 236, having its movable pole piece in engagement with its pole engaging contact 204 during popping and in engagement with contact 206 when the kettle 10 has been heated to a predetermined temperature.

Wires 72, 76, 78, 82, 88 and 89 of FIG. 1 are eliminated and new wires 200, 208, 210 and 212 appear in FIG. 2. Otherwise, the machine as depicted in FIG. 2 is the same as in FIG. 1; accordingly, like reference numerals are used to designate identical parts.

Heater 34 in FIG. 2 is energized through the following circuit:

From line 60, through switch 58, wires 62, 64, 66 and 68, heater 34, wire 70, thermostat 236 (via contact 204) and wires 74 and 200 to line 80.

When thermostat 236 moves into engagement with contact 206, motor 20 is energized as follows:

From line 60, through switch 58, wires 62, 64, 66 and 210, motor 20, wire 84, pole 40 and contact 86 of switch 44, wire 212, thermostat 236 (via contact 206) and wires 74 and 200 to line 80.

From this point, the cycle of operation is the same as in FIG. 1 except that upon cooling, wherein thermostat 236 re-engages contact 204, the circuit for operating motor 20 to complete the closing of bottom 16 until pin 38 slips off poles 40—42, is traced as follows:

From line 60, through switch 58, wires 62, 64, 66 and 210, motor 20, wire 84, pole 40 and contact 90 of switch 44, wire 208, thermostat 236 (via contact 204) and wires 74 and 200 to line 80.

It is to be noted that in the form of the invention shown by FIG. 2, motor 20 is not in series with heater 34 during the dumping cycle, as in FIG. 1. The same is true in the embodiment of FIG. 3, wherein is provided, in lieu of the single thermostatic switch 36 of FIG. 1, a pair of single pole, single-throw, thermostatic switches 336 and 337 within bottom 16 of kettle 10. Switch 336 opens and switch 337 closes upon completion of popping, i.e., a temperature rise to a predetermined level.

Here again, wires 72, 74, 76, 78, 82, 88 and 89 of FIG. 1 have been eliminated and new wires 300, 308, 310, 312, 314 and 316 appear in FIG. 3. Otherwise, the machine shown in FIG. 3 is the same as in FIG. 1 and like reference numerals are employed.

Heater 34 in FIG. 3 is energized through the following circuit:

From line 60, through switch 58, wires 62, 64, 66 and 68, heater 34, wire 70, thermostat 336, and wires 314, 316 and 300 to line 80.

When thermostat 337 closes, motor 20 is energized as follows:

From line 60, through switch 58, wires 62, 64, 66 and 310, motor 20, wire 84, pole 40 and contact 86 of switch 44, wire 312, thermostat 337 and wires 316 and 300 to line 80.

From this point, the cycle of operation is the same as in FIG. 1 except that upon cooling, wherein thermostat 336 recloses, the circuit for operating motor 20 to complete the closing of bottom 16 until pin 38 slips off poles 40—42 is traced as follows:

From line 60, through switch 58, wires 62, 64, 66 and 310, motor 20, wire 84, pole 40 and contact 90 of switch 44, wire 308, thermostat 336, and wires 314, 316 and 300 to line 80.

Having thus described the invention what is claimed as new and desired to be secured by Letters Patent is:

1. Control circuitry for a popcorn machine provided with a popping kettle, a bottom, a popcorn storage container having an actuatable slide gate providing dispensing means therefor, a fluid seasoning storage receptacle having fluid pump means coupled therewith, and shiftable hinge means swingably mounting said bottom on said kettle for movement from a position closing the kettle to a position clearing the kettle to permit gravitation of popped corn therefrom, said circuitry comprising:

electrical heater means adapted to be disposed within said bottom in thermal interchange relationship thereto for heating said bottom and thereby popcorn within said kettle;

electrically responsive dumping means adapted to be operably coupled with said hinge means for shifting the latter to thereby swing said bottom from said closing position to said clearing position, back to a partially closed, contents-retaining position, and then to said closing position;

electrical thermostat means adapted to be disposed within said bottom in thermal interchange relationship thereto and operably coupled with said heater means for actuating said heater means when said thermostat means is in a closed position, said thermostat means being actuatable from said closed position thereof to an open position when said bottom is raised to a predetermined elevated temperature;

a source of electrical power; and first electrically conducting means operably coupling said heater means and said dumping means with said source for operating said heater means only when said thermostat means is in said closed position thereof and for operating said heater means and said dumping means while said thermostat means is in said open position thereof, said dumping means including a motor for returning said bottom toward said closed position after said bottom has moved into said clearing position, there being means on said dumping means for de-energizing said motor when said bottom is in said partially closed position and for interconnecting said motor and said thermostat means in series relationship with said source, whereby said bottom is moved to the closing position thereof when said thermostat means moves to its closed position upon cooling.

2. Control circuitry as set forth in claim 1, wherein is included second electrically conducted means for coupling said heater means and said thermostat means in series relationship with said source when said thermostat means is in the closed position thereof, said first conducting means including a first single-pole, double-throw switch disposed for coupling said thermostat means and said motor in parallel relationship with said source when said thermostat means is in said closed position and when the shiftable pole of said first switch is in one circuit-closing location thereof.

3. Control circuitry as set forth in claim 2, wherein said dumping means includes means for shifting the shiftable pole of said first switch from said one location thereof to the other circuit-closing location thereof when said bottom is moved into said partially closed position thereof, said first switch being disposed for coupling said motor and said thermostat means in series relationship with said source when said shiftable pole is in said other location, whereby said bottom is moved into said closed position thereof when said thermostat means moves into its closed position upon cooling.

4. Control circuitry as set forth in claim 3, wherein said means for shifting said shiftable pole includes a disc coupled with said motor for rotation relative to said first switch when said motor is energized and provided with a projection thereon engageable with said shiftable pole for shifting the latter to said other location.

5. Control circuitry as set forth in claim 4, wherein is included a second, single-pole, double-throw switch positioned adjacent said disc, the shiftable pole of said second switch being disposed in proximity to and below the shiftable pole of said first switch, the last-mentioned shiftable pole being disposed for shifting the shiftable pole of said second switch into one circuit-closing location, and including a pump motor adapted to be operably coupled with said pumping means, said second switch being disposed for coupling said pump motor with said source for energizing the motor when the shiftable pole of said second switch is in the one circuit-closing location thereof.

6. Control circuitry as set forth in claim 5, wherein is provided a third, single-pole, double-throw switch interconnecting said second switch and said pump motor, and cam means operably coupled with said pump motor for rotation from a circuit-closing position to a circuit-interrupting position when said pump motor is energized, said cam means being engageable with the shiftable pole of said third switch for interrupting the circuit between said second switch and said pump motor after the latter has been energized for a predetermined time interval and after said cam means has rotated through a predetermined arc.

7. Control circuitry as set forth in claim 6, wherein is included solenoid means adapted to be operably coupled with said slide gate for opening and closing the latter, said third switch being coupled with said solenoid means and with said source for energizing said solenoid means when the circuit between said pump motor and said second switch is interrupted.

8. Control circuitry as set forth in claim 7, said third switch being disposed for closing the circuit between said pump motor and said second switch when said cam means is in the circuit-interrupting position thereof and said disc is caused to rotate to move the projection thereon away from the shiftable poles of said first and second switches to permit each of said shiftable poles to shift to its one location, whereby the pump motor is energized and said cam means moves to its circuit-closing position.

References Cited in the file of this patent

UNITED STATES PATENTS

| Re. 20,570 | Bushway | Dec. 7, 1937 |
| 1,224,347 | Wolfe | May 1, 1917 |
| 2,027,698 | Parks et al. | Jan. 14, 1936 |
| 2,108,627 | Tyler | Feb. 15, 1938 |
| 2,554,802 | Waas | May 29, 1951 |
| 2,771,836 | Denehie | Nov. 27, 1956 |
| 2,902,920 | Waas | Sept. 28, 1959 |
| 2,948,438 | Lippert | Aug. 9, 1960 |